United States Patent [19]

Shagoury

[11] Patent Number: 5,438,957
[45] Date of Patent: Aug. 8, 1995

[54] BIRD BATH WHEREIN THE BOWL MAY ALWAYS BE FILLED TO THE BRIM

[76] Inventor: Paul B. Shagoury, 48 Fairmount Ave., P.O. Box 506, Hyde Park, Mass. 02136

[21] Appl. No.: 313,555

[22] Filed: Sep. 27, 1994

Related U.S. Application Data

[63] Continuation-in-part of Ser. No. 92,139, Jul. 15, 1993, abandoned.

[51] Int. Cl.⁶ .............................................. A01K 39/02
[52] U.S. Cl. ........................................ 119/69.5; 248/148
[58] Field of Search ................ 119/61, 69.5; 248/128, 248/133, 148, 146, 158

[56] References Cited

U.S. PATENT DOCUMENTS

| | | | |
|---|---|---|---|
| 1,449,974 | 3/1923 | Crimmel | 248/128 |
| 1,895,702 | 1/1933 | Burley | 119/69.5 |
| 2,071,276 | 2/1937 | Barbiers | 248/128 |
| 2,484,263 | 10/1949 | Atkinson | 119/61 |
| 2,552,051 | 5/1951 | Margulies | 248/146 |
| 2,552,474 | 5/1951 | Amberg | 248/146 |
| 2,988,333 | 6/1961 | Mesic | 248/146 |
| 3,617,022 | 11/1971 | Wiggins | 248/158 |
| 4,630,569 | 12/1986 | Dieleman | 119/69.5 |

FOREIGN PATENT DOCUMENTS 102105  11/1916  United Kingdom ............... 248/146

*Primary Examiner*—Todd E. Manahan

[57] ABSTRACT

A bird bath assembly comprises a shallow, concave, bowl having a smooth, continuous outside surface; and a hollow, cylindrical, vertical stand. The stand has a frusto-conical upper end terminating in an upper rim upon which the bowl rests. The rim has a diameter of at least 45% of the diameter of the bowl to accommodate all movements and adjustments to the bowl. The stand further includes a circular base extending outwardly from a lower end thereof. The base has a diameter substantially equal to the diameter of the rim. The bowl may be adjustably positioned on the rim such that the bowl can be evenly filled to the brim with water even when the stand becomes tilted.

1 Claim, 2 Drawing Sheets

БИРД BATH WHEREIN THE BOWL MAY
ALWAYS BE FILLED TO THE BRIM

REFERENCES TO RELATED APPLICATIONS

This application is a continuation-in-part of the application with Ser. No. 08/092,139 which was filed on Jul. 15, 1993, now abandoned. The earlier filing date of this application is hereby claimed.

BACKGROUND OF THE INVENTION

1. Field of the Invention

This invention relates to bird bath structures for use by birds in backyard gardens and homes.

2. Prior Art

Prior arts of this type have generally comprised of stands with bowls resting on the upper ends of the stands which have a grooved section under the bowls and fit onto the top ridge portions of the stands. If the stands became tilted or uneven, the tilt was carried over onto the bowls and thus prevented the bowls from being evenly filled to the brim with water.

There are no prior arts known whereby when the stand became tilted, the bowl could be leveled on the tilted stand so as to allow the water level to be evenly filled to the brim of the bowl.

In the present invention, the bowl of the bird bath can be evenly filled to the brim of the bowl by leveling the bowl on the stand, even though the stand on which it rests has become uneven or tilted.

SUMMARY OF THE INVENTION

The principal object of the present invention is to provide a bird bath which can be evenly filled with water to the brim of the bowl even though the stand on which the bowl rests becomes uneven or tilted.

Another object of the present invention is to allow bird bath owners to transfer their present bowls onto the stands of the present invention so that their present bowls may be filled evenly to the brim with water even if the stand should become tilted.

Another object of the present invention is to have the bowl of the bird bath evenly filled to the brim with water for use by wild birds.

Another object of the present invention is to have a bowl evenly filled to the brim so that when birds take a bath, there will still be sufficient water in the bowl for the birds that follow for their bath.

It is also an object of the present invention to provide such a structure which is of simple, inexpensive construction.

Another object is to provide such a structure that it can be assembled quickly and easily.

Another object of the present invention is to provide a bird bath that is strong and durable, has a minimun of parts, is simple, easy and quick to assemble and inexpensive to manufacture.

Other objects, features and advantages of the invention will become apparent as the description thereof proceeds when considered in connection with the accompanying illustrative drawings.

The present invention comprises simply of a shallow bowl with a smooth bottom on the outside of the bowl which does not have a grooved section on the bottom of the bowl that is in use today. In the present invention, the bottom of the bowl rests on the rim on the upper portion of the stand. The rim on the upper portion of the pedestal or stand must be of sufficient circumference to accommodate movement of the bowl. The bowl can topple off the pedestal or stand if not perfectly normal to the ground when the bowl is filled to the brim with water, if the circumference of the rim of this pedestal is not large enough to accommodate the bowl. To fill the bowl to the brim with water, the bowl must be adjusted on the rim of the pedestal or stand, one edge of the bowl may extend too far over the rim of the pedestal or stand and topple off, however, a rim with sufficient circumference to accommodate the bowl on top of the stand will prevent the bowl from toppling. I have discovered that the upper rim of the pedestal or stand upon which the bowl rests must have a diameter at least approximately 45% of the diameter of the bowl to allow a sufficent circumference to prevent the bowl from toppling over when the bowl is full to the brim, even when the pedestal or stand is at wide angle from normal with the ground. As a result, by adjusting the bowl on the rim of the pedestal or stand, the water level would be even throughout the bowl which now may be filled to the brim.

DESCRIPTION OF THE PREFERRED EMBODIMENT

Figure 1:
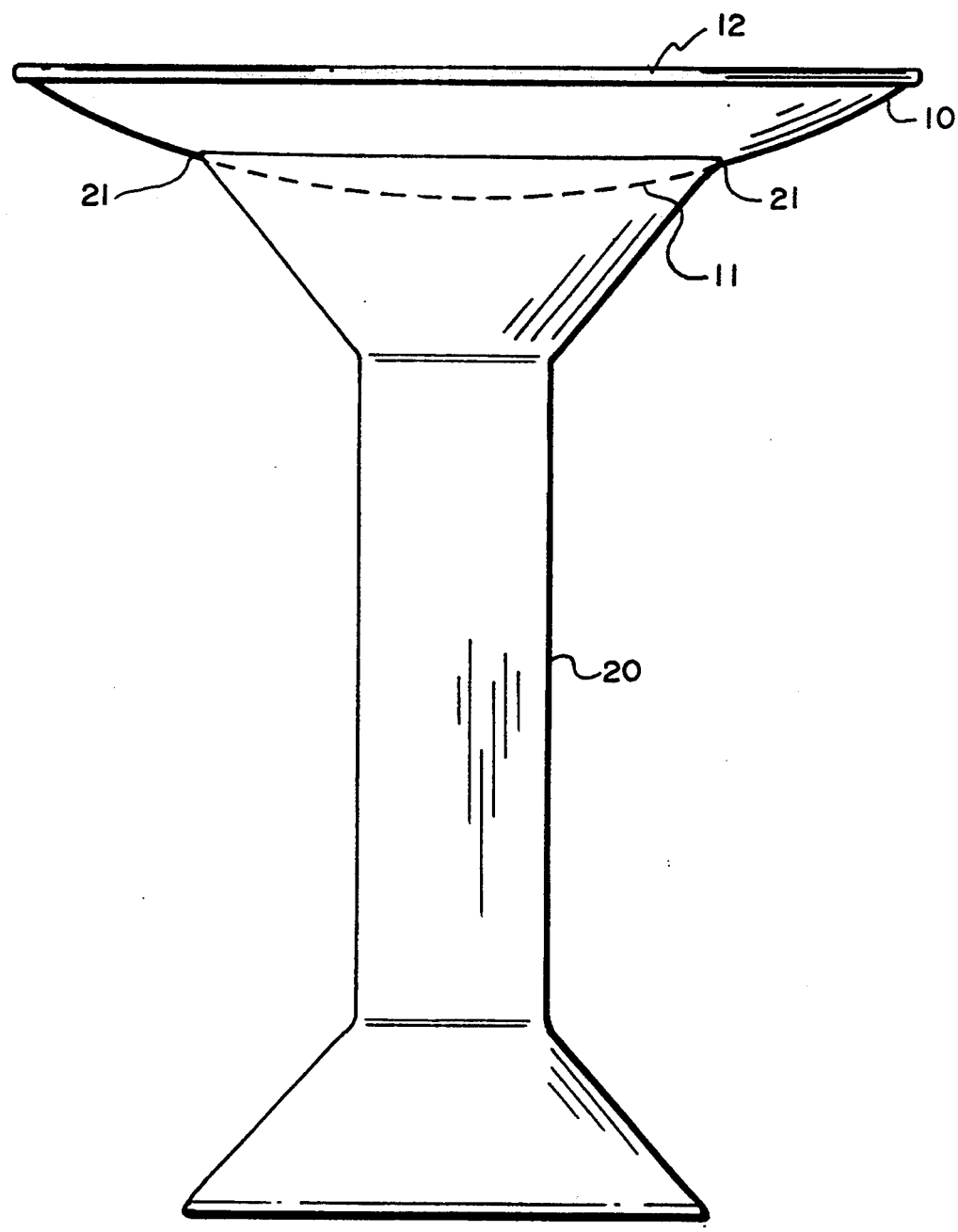
FIG. 1 shows a level stand without a tilt and the bowl or container is evenly resting on the rim of the stand.

FIG. 1 is the bird bath in the present invention comprising of a bowl 10 with the bottom of the outside of the bowl 11 resting on rim 21 which is on the upper end of hollow vertical stand 20. Bowl 10 has a straight edge 12 approximately 1" in length overhanging from the rim along the perimeter of the bowl so that the bowl may be easily adjusted while being evenly filled to the brim with water.

Figure 2:
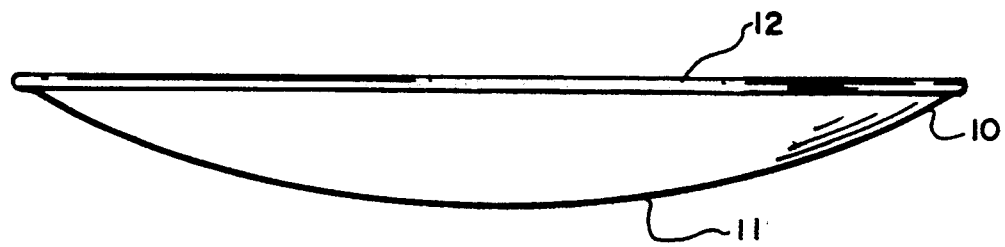
FIG. 2 is the side view of the bowl showing that the base on the outside of the bowl is completely smooth.

FIG. 2 is the drawing of the bowl 10 showing that the bottom of bowl 11 is smooth and does not have a grooved section which is commonly in use with bird bath bowls. It also shows straight edge 12 overhanging from the rim along the perimeter of the bowl so that the bowl may be easily and comfortably adjusted on the rim.

Figure 3:
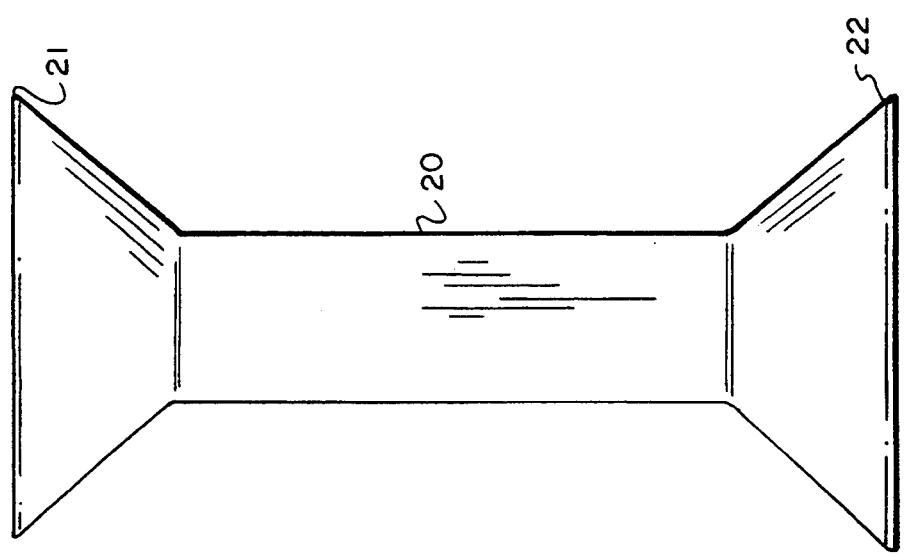
FIG. 3 is the vertical section of the hollow stand which shows that the circumference of the rim on upper portion of the stand is sufficient to accommodate the bowl so as to allow for any adjustments to the bowl when the stand has become tilted or uneven while the bowl is being filled to the brim with water.

FIG. 3 shows a cylindrical stand 20 which is hollow that has a base 22 on the lower end and on the upper end a rim 21 for the acceptance of bowl 10. Rim 21 has a circumference sufficient to accommodate all movements of bottom of bowl 11.

Figure 4:
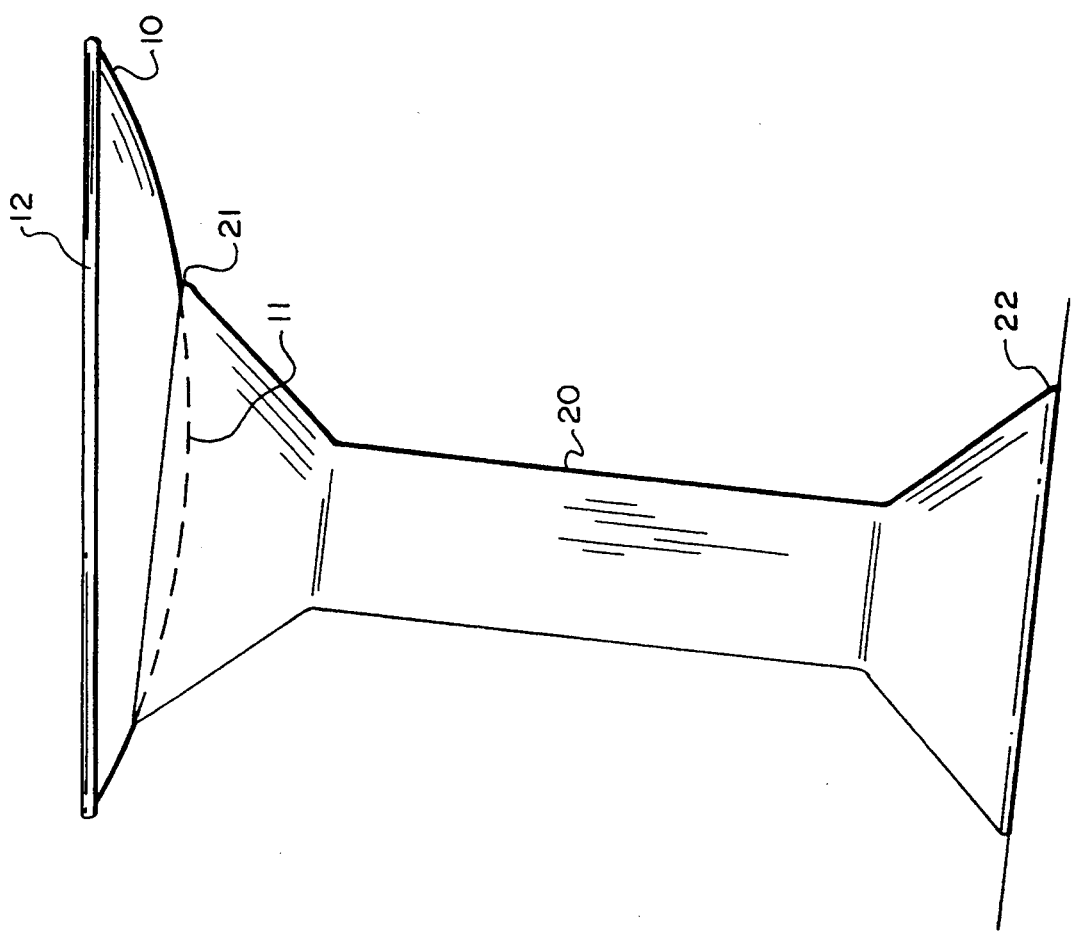
FIG. 4 shows an uneven or tilted stand whereby a slight adjustment to the bowl on the rim of the stand causes the bowl to become level so the bowl may be evenly filled to the brim with water.

FIG. 4 shows that the base of stand 20 is uneven or has been tilted, slightly but bottom of bowl 11 has been adjusted on rim 21 to correct the tilt in bowl 10 thus causing bowl 10 to become level thus allowing bowl 10 to be evenly filled to the brim with water.

Although but one embodiment of the present invention has been illustrated and described, it will be apparent to those skilled in the art that various changes and modifications may be made therein without departing from the spirit of the invention and having thus described my invention what I claim is:

1. A bird bath assembly comprising:
    a shallow, concave, circular bowl having a smooth, continuous outside surface; said bowl having a straight edge overhanging the perimeter of the bowl; and
    a hollow, cylindrical, vertical stand, said stand having a frusto-conical upper end terminating in an upper rim, said rim having a diameter of at least 45% of the diameter of the bowl; said stand further including a circular base extending outwardly from a lower end thereof, said base having a diameter substantially equal to the diameter of said rim; said bowl resting on said rim and supported by said stand, whereby the bowl may be adjustably positioned on the rim such that the bowl can be evenly filled to the brim with water even when the stand becomes tilted.

* * * * *